W. WEEKES & D. E. ABSOLOM.
TRANSMISSION MECHANISM.
APPLICATION FILED APR. 6, 1912.
1,067,697.
Patented July 15, 1913.
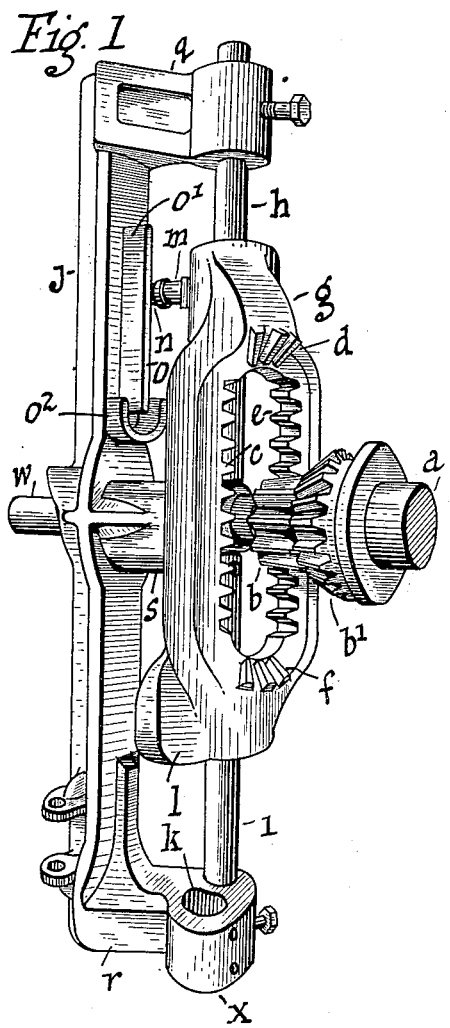
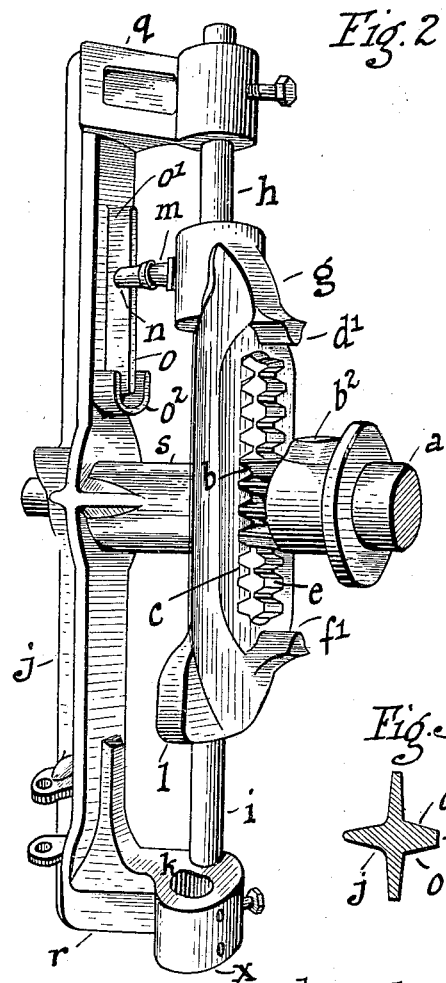
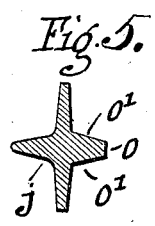
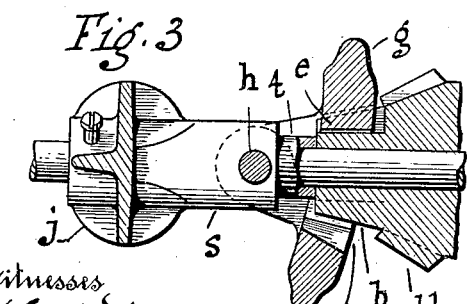
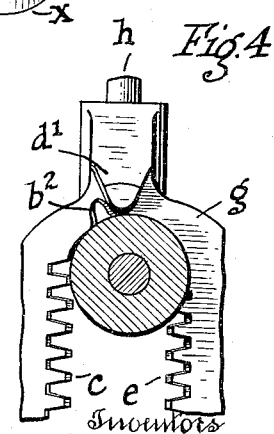

UNITED STATES PATENT OFFICE.

WILLIAM WEEKES AND DAVID EARNEST ABSOLOM, OF FOOTSCRAY, VICTORIA, AUSTRALIA.

TRANSMISSION MECHANISM.

1,067,697. Specification of Letters Patent. Patented July 15, 1913.

Application filed April 6, 1912. Serial No. 688,990.

*To all whom it may concern:*

Be it known that we, WILLIAM WEEKES and DAVID EARNEST ABSOLOM, subjects of the King of Great Britain and Ireland, &c., residing at Footscray, in the State of Victoria, Commonwealth of Australia, have invented certain new and useful Improvements in Transmission Mechanism; and we do hereby declare the following to be a full, clear, and exact description of the invention, such as will enable others skilled in the art to which it appertains to make and use the same.

Our invention relates to improvements in transmission mechanisms, especially adapted for use in windmills, and it consists in the constructions, combinations and arrangements herein described and claimed.

In the accompanying drawings forming a part of this application, and in which similar reference symbols indicate corresponding parts in the several views:—Figure 1 is a perspective view, illustrating one embodiment of our invention; Fig. 2 is a similar view, illustrating a slight modification; Fig. 3 is a horizontal section through the power shaft in Fig. 1; Fig. 4 is a detail view of the modified construction shown in Fig. 2; Fig. 5 is a horizontal section of the bracket and retaining rail shown in Fig. 1.

On a shaft $a$ which may represent the axle of a wind wheel, we provide any suitable pinion, $b$, (having inner and outer teeth, the latter marked $b^1$) the appropriate teeth of which gear with a movable toothed rack the teeth of which form a path successive parts of which are marked $c$ $d$ $e$ $f$. The rack during both its up stroke and its downstroke remains in gear with the pinion $b$. The rack teeth are on a casting $g$ or body of any suitable design. When this rack reaches the top of its stroke it will rock to the other side of its path, and when it reaches the bottom of its stroke it will rock back again. In addition to rack teeth $c$, $e$, which engage with the inner teeth of the pinion $b$, during the up and down strokes, there is or are a transverse tooth or teeth as $d$ and $f$ at the ends of the series of teeth $c$ $e$, and so located as to engage the outer teeth $b^1$ of the pinion. Teeth $d$, $f$, are best located as shown in a plane outward of teeth $c$, $e$.

In the illustrations teeth $c$ are set, see Fig. 3, obliquely to the opposite teeth $e$, and each series of teeth forms a vertical line, but the latter could be curved instead. Rack body $g$ is provided with any suitable projection or guide member as $m$, carrying ordinarily, antifriction means as a roller $n$, and working against or around a suitably set guide means as a rail $o$ with suitable sides $o^1$ the dimensions of the rail being according to the movement of the rack teeth, so that the path of roller $n$ or any substituted projection is like the path around the teeth, but narrower. Thus when teeth $c$, $e$ form vertical series, the guide rail sides $o^1$ (which are, see Fig. 6, oblique to one another so that the rail base is wider than its ridge) are also vertical, and to correspond with the teeth course where it is transverse at the stroke ends $d$ and $f$, the guide rail ends allow the projection $n$ to cross. The upper end of rail $o$ gives such momentary support to the sliding rack member $g$ as may be useful, and at the other end of the stroke, support is usefully given by a guard plate or the like $o^2$ on which the roller or projection may travel without any danger of its being too far depressed.

Rail $o$ or the like is of any suitable make either affixed to or integral with suitable framing, as a bracket $j$ having end arms $q$ and $r$, and an intermediate bearing arm $s$.

Arms $q$, $r$, and $s$ are made adjustable when desired, but are shown integral with bracket $j$. They may contain bearings or holes to support guide rods, or the like as $h$, $i$, or a single rod through arm $s$ may enter arms $q$ and $r$. Arm $s$ has a reduced end $t$ formed with a bearing for the rear end of the spindle of said pinion $b$.

$w$ indicates a projection from bracket $j$ to fix the latter on a support. A lateral guide slot $k$ for a pump rod or drive rod; the body $g$ being provided with suitable means, such as a lug $l$, for connecting the drive rod thereto, and said rod having a slight oscillatory movement within the guide slot $k$, projections, guiding holes, and anti-friction devices however, as may be found, in any particular case or class of cases, suitable, will be used in practice.

Various means may be employed for imparting the desired rocking movement to the rack member $g$; for example, instead of the projecting bevel teeth $d$, $f$, to engage teeth as $b^1$, there may be an upper projecting tooth $d^1$ and a lower one $f^1$ on body $g$ to engage a tooth or cam projection $b^2$ on the boss of the pinion $b$, the rocking action produced being substantially as described—see Fig. 4,—in which parts $b^2$ and $d^1$ are shown meeting.

The rotating pinion $b$ retains one position relatively to bracket $j$, but the body $g$ having the obliquely set teeth $c$ and $e$ rocks as already indicated at the end of each stroke, and the projection $n$ upon reaching the top of its travel on one side of rail $o$ or the like crosses the rail, and then descends on the other side and passes below it.

Having described this invention what is claimed by Letters Patent is:—

1. In a transmission mechanism, the combination of a bracket provided with a vertical series of upper, lower, and intermediate arms, vertical guides extending between said several arms, a rack member slidably and rockingly mounted on said vertical guides, an endless rack on said member, a power shaft extending through said endless rack and journaled in said intermediate bracket arm, a gear on said shaft in mesh with said endless rack, a guide track on said bracket, a projection on the upper portion of said rack member for engaging said track, a lug on said rack member for attachment to a drive rod, and a guide on said lower bracket arm for the drive rod.

2. In a transmission mechanism, the combination of a bracket provided with a forwardly-projecting vertical series of upper, lower, and intermediate arms, vertical guides extending between said several arms, a rack member slidably and rockingly mounted on said vertical guides, an endless rack comprising parallel series of rearwardly-converging bevel teeth, a projection on the upper portion of said rack member a bearing roller on said projection, a guide track on said bracket provided with forwardly-converging vertical sides inclined to flatly engage said bearing roller when said rack member is rocked to its respective extreme positions, a power shaft extending through said endless rack and journaled in said intermediate bracket arm, a bevel gear on said shaft in mesh with said endless rack, a lug on said rack member for attachment of a drive rod, and a guide on said lower bracket arm for the drive rod.

In testimony whereof we affix our signatures in presence of two witnesses.

WILLIAM WEEKES.
DAVID EARNEST ABSOLOM.

Witnesses:
GEORGE G. TURRI,
BEATRICE M. LOWE.

---

Copies of this patent may be obtained for five cents each, by addressing the "Commissioner of Patents, Washington, D. C."